United States Patent [19]

Hirasawa

[11] Patent Number: 5,029,075
[45] Date of Patent: Jul. 2, 1991

[54] ROUTING METHOD IN A COMPUTER COMMUNICATION NETWORK SYSTEM

[75] Inventor: Yutaka Hirasawa, Tokyo, Japan

[73] Assignee: Kabushiki Kaisha Toshiba, Kawasaki, Japan

[21] Appl. No.: 436,979

[22] Filed: Oct. 16, 1989

Related U.S. Application Data

[63] Continuation of Ser. No. 323,131, Mar. 13, 1989, abandoned, which is a continuation of Ser. No. 42,826, Apr. 27, 1987, abandoned.

[30] Foreign Application Priority Data

Apr. 30, 1986 [JP] Japan ............................ 61-98223/86

[51] Int. Cl.$^5$ .............................................. G06F 15/16
[52] U.S. Cl. ................................ 364/200; 364/284.3; 364/284.4
[58] Field of Search ... 364/200 MS File, 900 MS File; 370/85.3; 340/825.06

[56] References Cited

U.S. PATENT DOCUMENTS

| 4,007,450 | 2/1977 | Haibt et al. | 364/200 |
| 4,363,093 | 12/1982 | Davis et al. | 364/200 |
| 4,466,060 | 8/1984 | Riddle | 364/200 |
| 4,577,313 | 3/1986 | Sy | 370/89 |
| 4,604,693 | 8/1986 | Chadima, Jr. et al. | 364/200 |

Primary Examiner—Michael R. Fleming
Assistant Examiner—Debra A. Chun
Attorney, Agent, or Firm—Oblon, Spivak, McClelland, Maier & Neustadt

[57] ABSTRACT

Predetermined information is included in an information portion for a given node, which is included in load information sent through a link selected as a circuit for sending data to the given node. The link used for transmission of load information with the predetermined information can be discriminated from other links. In a node which has received the load information with the predetermined information, the circuit which is used for sending the load information with the predetermined information is excluded from routing candidates.

5 Claims, 3 Drawing Sheets

ROUTING METHOD IN A COMPUTER COMMUNICATION NETWORK SYSTEM

This application is a continuation of application Ser. No. 07/323,131, filed on Mar. 13, 1989, now abandoned, which is a continuation of application Ser. No. 042,826, filed on Apr. 27, 1987, now abandoned.

BACKGROUND OF THE INVENTION

The present invention relates to a routing system for calculating transmission loads on the basis of load information sent from adjacent nodes when data is sent from a self node to other nodes as the adjacent nodes within a network under the assumption that each node has a store and forward function, and for performing routing in units of destination nodes and, more particularly, to a routing system in a computer communication network system using a communication protocol of a message or packet switching type.

In computer networks, a scheme for determining which of the circuits (links) is used to transmit data between computers or terminals (to be referred to as nodes hereinafter) is called routing. One of the routing systems is used in an ARPANET (Advanced Research Project Agency Network). According to this routing system, optimal sequential routing is performed on the basis of changes in loads of circuits and the nodes within the network. In order to realize this system in practice, each node sends load information for routing to adjacent nodes. The load information represents a load for transmitting data from a self or given node to each adjacent node within the network. The load information is obtained by adding a load of the given node and a load of a circuit used for receiving load information from each adjacent node to the load represented by the load information received by each adjacent node. Each node determines a circuit with a minimum data transmission load in units of destination nodes when data is sent to each adjacent node within the network, thus achieving routing.

According to this conventional routing system, when a system failure such as a circuit disconnection causing an abrupt change in network condition occurs, it takes a long period of time to set in each node new load information (routing information) corresponding to such a change. The same data tends to be repeatedly exchanged between given nodes as if they are playing "catch". For example, in a network shown in FIG. 1, assume that a circuit (to be referred to as a link hereinafter) 12-2 for connecting nodes 11-2 and 11-3 is disconnected, which is then detected by node 11-2. In this state, when node 11-2 is to send data to node 11-3, node 11-2 selects link 12-1 since the load of link 12-2 is infinite. In other words, load information is updated and then routing is performed. Data for node 11-3 is sent onto link 12-1. Node 11-1 receives data sent from node 11-2 to node 11-3 through link 12-1, node 11-1 sends this data onto link 12-1 so as to send it to node 11-3. When link 12-2 is disconnected, data for node 11-3 is repeatedly exchanged between nodes 11-1 and 11-2 until the route to the node is discriminated to be absent. As a result, link 12-1 is abnormally overloaded.

In order to solve the above problem in a conventional routing system, the load information is not updated for a predetermined period of time in a node where a link disconnection has been detected. The current load information is made invalid, and control is shifted to higher-level retransmission processing. This period is called "down time". This system is effective in the network shown in FIG. 1. However, in a network having link 12-3 for directly connecting nodes 11-1 and 11-3 shown in FIG. 2, the following problem is posed. In the network shown in FIG. 2, even if link 12-2 is disconnected, it is possible to send data from node 11-2 to node 11-3 through link 12-1, node 11-1, and link 12-3. If the down time is set unconditionally, as described above, data cannot be transmitted during the down time although the data transmission route is present, thus wasting transmission time. However, according to the conventional routing system, it is impossible for node 11-2 to discriminate whether a data transmission route is present between nodes 11-1 and 11-3. Therefore, the down time must be inevitably set unconditionally, as described above.

SUMMARY OF THE INVENTION

It is an object of the present invention to provide a routing method in a computer communication network system wherein a circuit used for sending data from an adjacent node during data transmission can be discriminated as a circuit excluded from circuits subjected to routing, and therefore unconditional setting of a down time upon detection of a circuit failure can be prevented.

In order to achieve the above object of the present invention, there is provided a routing method in a computer communication network system comprising a plurality of network nodes each having a store and forward function and links for connecting adjacent ones of said nodes, comprising the steps of: (a) receiving load information sent from the adjacent nodes through the links; (b) calculating load values (AIT(i,j)) (i: a link number; and j: a node number) required for sending data to other nodes within the network as the adjacent nodes through the links, the load values (AIT(i,j)) being calculated on the basis of link load values (LIT(i)) (i: the link number) representing loads of the links, a node load value (NLT) representing a load of an intra node, and the load information (CITri) (i: the link number) received by said receiving section; (c) storing, according to the nodes, the load values (AITij) having the minimum values; (d) storing, according to nodes, link numbers corresponding to the load value having the minimum value calculated in step (b); (e) adding data-sent-back-inhibition information to the load values corresponding to the respective link numbers stored in step (d); and (f) sending, through the links to the adjacent nods, minimum load values according to the nodes stored in the step (c) as a transmission load information.

According to the present invention, the load information sent to a given node through a circuit selected as a data transmission route includes predetermined information in an information component associated with the given node. Therefore, the circuit used for transmitting the load information with the predetermined information can be discriminated from other circuits. In the node which receives the load information with the predetermined information, the circuit used for transmitting this load information is excluded from circuits subjected to data transmission routing. Even if a circuit is disconnected from the network, a circuit can be selected to prevent the transmitted data from being sent back from the adjacent node. Therefore, the down time need not be set otherwise unless circuits subjected to routing are present.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENT

Figure 1:
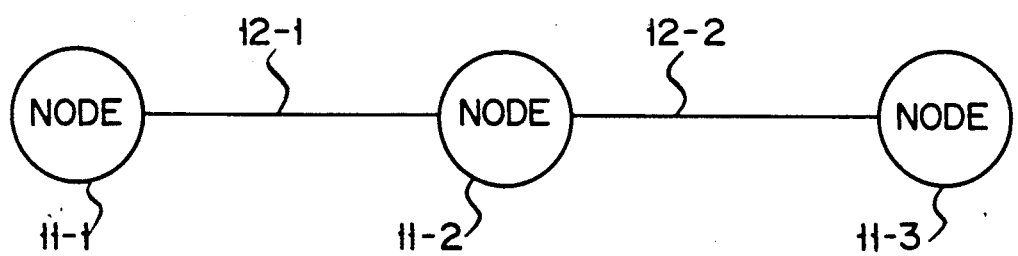
FIG. 1 is a schematic view showing a conventional network configuration.
Figure 2:
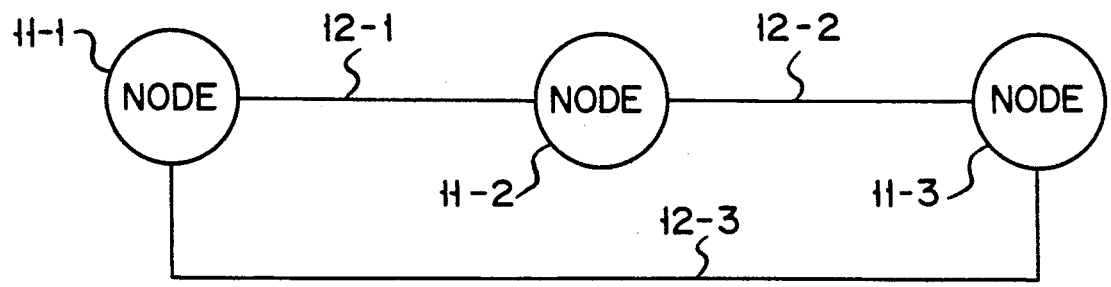
FIG. 2 is a schematic view showing another conventional network configuration.
Figure 3:
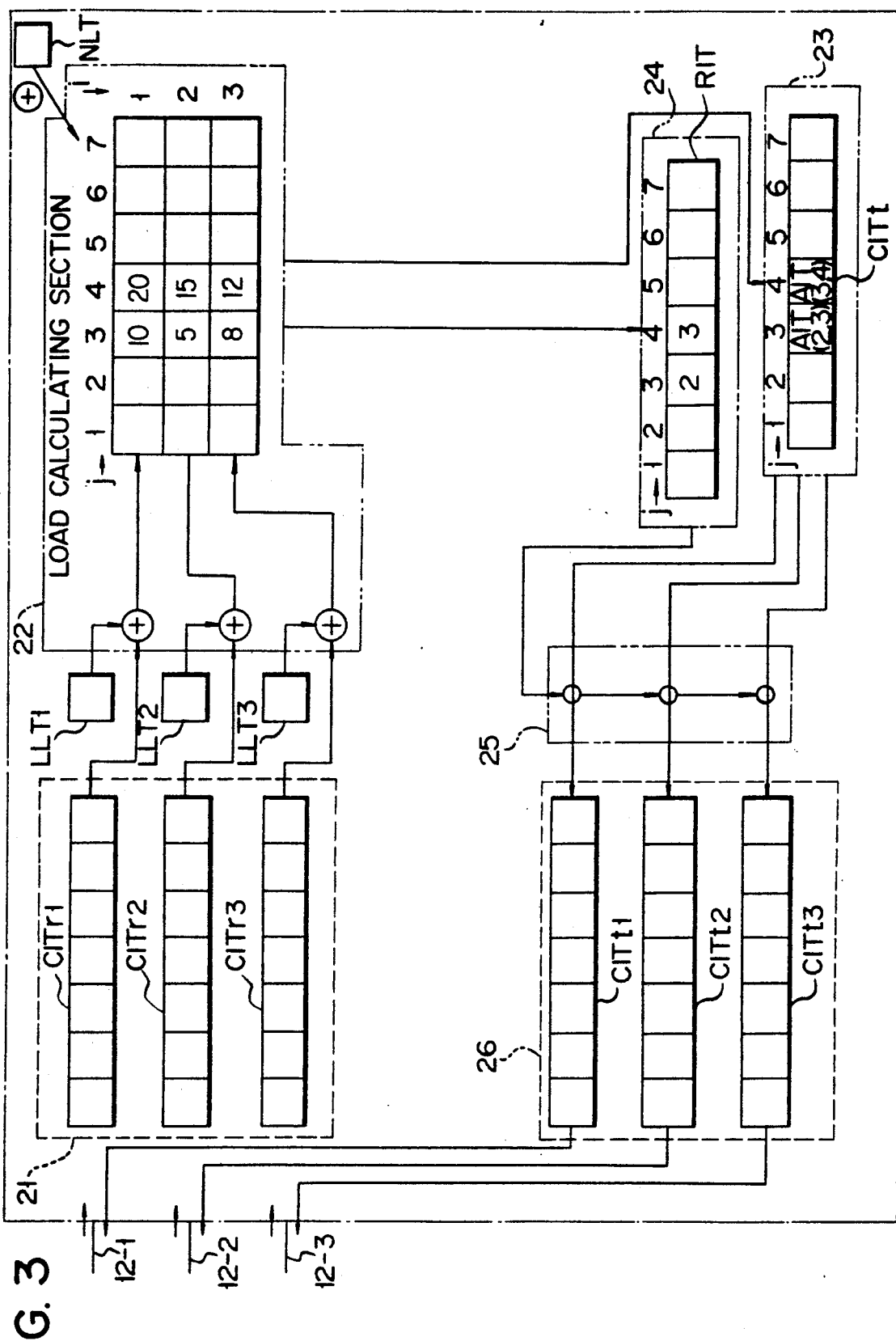
FIG. 3 is a block diagram showing a routing system according to an embodiment of the present invention.
Figure 4:
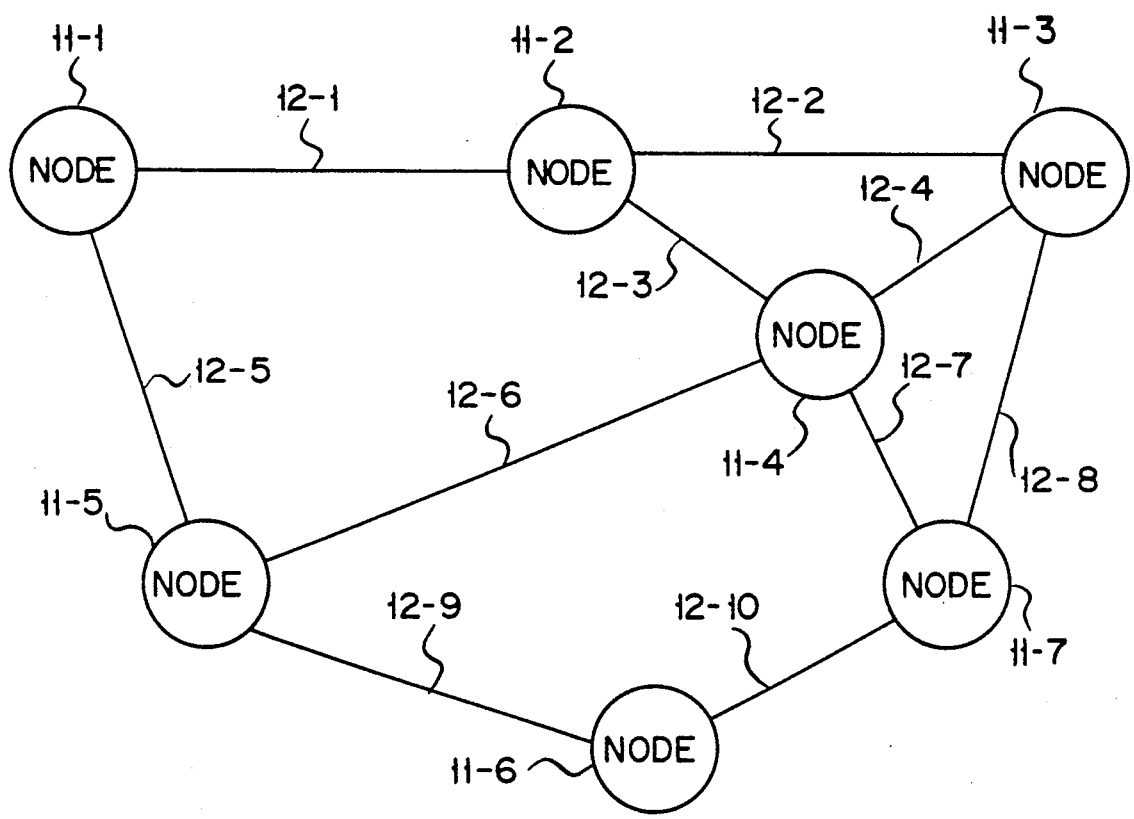
FIG. 4 is a schematic view showing a network constituted by using nodes, one of which is shown in FIG. 3.

A preferred embodiment of the present invention will be described with reference to a block diagram of a node shown in FIG. 3. A node shown in FIG. 3 is applied as node 11-2 in a network shown in FIG. 4. Node 11-2 shown in FIG. 3 is connected to adjacent node 11-1 through link 12-1, to node 11-3 through link 12-2, and to node 11-4 through link 12-3. In node 11-2, receiving section 21 receives load information CITr1 (Cost Information Table element) sent from adjacent node 11-1 through link 12-1, load information CITr2 sent from adjacent node 11-3 through link 12-2, and load information CITr3 sent from adjacent node 11-4 through link 12-3. Load information CITri (i is the link number) consists of load information elements CITri(j) representing loads when data is sent from the source node to destination nodes 11-$j$ ($j$ is the node number).

Load calculating section 22 adds link load value LLTi (Link Load Table element) representing a load of link 12-$i$ (this link load value is represented by the number of bytes of data running on link 12-$i$ within the most recent period of time), node load value NTL (Node Load Table element) representing a load of the node (the node load value is represented by the number of bytes of exchange data processed within the most recent period of time), and load information CITri received by receiving section 21, and calculates load value AIT(i,j) (Array Information Table element) when data is sent to each node 11-$j$ through corresponding link 12-$i$ within the network. Transmission load information storage 23 is updated by load calculating section 22 and stores load information CITt consisting of load information elements CITt(j) representing loads in units of nodes when data is sent from the self node to each node 11-$j$ within the network. Routing information storage 24 stores routing information RIT consisting of routing information elements RIT(i) (Route Information Table element), in units of destination nodes, representing correspondence between each node 11-$j$ and a link number used when this node serves as a destination node within the network. Transmission load information generating section 25 uses load information CITt and routing information and generates load information CITti to be sent to each adjacent node. Transmitting section 26 sends load information generated by generating section 25 onto link 12-$i$. Load information CITti serves as load information CITri for each adjacent node.

Receiving section 21 in node 11-2 receives load information CITr1, load information CITr2, and load information CITr3 respectively through links 12-1, 12-2, and 12-3, and these pieces of information are sent to load calculating section 22. Load information CITri (i=1, 2, and 3) include load information elements CITri(j) representing loads when data is sent from the adjacent nodes to node 11-$j$. Load calculating section 22 receives load information CITri (i=1, 2, and 3) received by receiving section 21. Load values AIT(i,j) for sending data from nodes 11-$j$ (j=2, 3, and 4) through corresponding links 12-$i$ (i=1 and 2) are calculated by the following equation:

$$AIT(i,j) = CITri(j) + LLT(i) + NLT$$

Load calculating section 22 calculates a minimum one of the values given by CITt(j)=AIT(i,j) (i=1, 2, and 3) and link number i for giving the the minimum value by using AIT(i,j) (i=1, 2, and 3; and j=1, 2, and 3) and calculates load information element CIT(j), constituting load information CITt, and routing information element RITj, constituting routing information RIT(j), in units of destination nodes (j). In this case, calculating section 22 excludes AIT(i,j) with circuit display information from candidates in CITt(j) calculations.

Load information CITt, consisting of load information elements CITt(j) of the respective destination nodes (j) and calculated by load calculating section 22, is stored in transmission load information storage 23. Routing information RIT, consisting of routing information elements RIT(j), is stored in routing information storage 24.

Transmission load information generating section 25 generates load information CITti corresponding to the links, i.e., load information CITt1 for link 12-1, load information CITt2 for link 12-2, and load information CITt3 for link 12-3, on the basis of load information CITt, stored in storage 23, and routing information RIT, stored in storage 24. These pieces of information are sent to transmitting section 26. Load information transmission to the adjacent node need not be periodically performed but may be performed only when the CITt value is changed. Load information CITti for link 12-$i$ is generated such that circuit display information is added to a j load information element, among load information elements CITt(j) (j=1, 2, and 3) constituting load information CITt, which satisfy condition RIT(j)=1. The circuit display information may be information obtained by changing the MSB of load information element CITt(j) into logic "1" (since the MSB is assigned as a sign bit and when the sign bit is updated to logic "1", the resultant data has a negative sign), or information may be obtained by using a complementary number of load information elements CITt(j). The circuit display information can be solely determined in a given network. In this case, load information element CITt(j) can have a negative sign, and the node receiving this element as CITri(j) must exclude the negative value from those in calculations of CITt(j) and RIT(j).

Specific circuit display information may be added to load information element CITt(j). In this case, the node which has received CITri consisting of load information element CITt(j) added with the circuit display information detects the received element subjected to exclusion from calculations of CITt(j) and RIT(j).

When transmission load information generating section 25 generates load information CITti (i=1, 2, and 3), transmission section 26 sends CITti (i=1), i.e., CITt1 onto link 12-1, CITti (i=2), i.e., CITt2 onto link 12-2, and CITti (i=3), i.e., CITt3 onto link 12-3.

Assume that data is sent from node 11-1 to node 11-3. In this case, the arrangement of node 11-2 is given, as shown in FIG. 3. Receiving section 21 in node 11-2 receives load information CITr1 from node 11-1 through link 12-1, load information CITr2 from node 11-3 through link 12-2, and load information CITr3 from node 11-4 through link 12-3. CITr1, CITr2, and CITr3 are supplied to load calculating section 22. Load information CITr1 includes load information element CITr1(2) representing a load required for sending data from node 11-1 to node 11-2 through link 12-1.

Similarly, load information CITr2 includes load information element CITr2(2) representing a load required for sending data from node 11-3 to node 11-2 through link 12-2, and load information CITr3 includes load information element CITr3(2) representing a load required for sending data from node 11-4 to node 11-2 through link 12-3.

When load calculating section 22 receives load information CITr1, it calculates load value AIT(2,3) representing a load required for sending data to node 11-3 through link 12-2 as follows:

$$AIT(2,3) = CITr2(3) + LLT(2) + NLT$$

Similarly, load values AIT(3,4) and AIT(1,1), respectively representing loads required for sending data to node 11-4 through link 12-3 and to node 11-1 through link 12-1, are calculated as follows:

$$AIT(3,4) = CITr3(4) + LLT(3) + NLT$$

$$AIT(1,1) = CITr1(1) + LLT(1) + NLT$$

Load calculating section 22 defines a smaller one of AIT(2,3) and AIT(3,4) as load information CITt(3) for node 11-3.

Assume that AIT(2,3) is smaller than AIT(3,4). In this case, CITt(3)=AIT(2,3). As the link number is 12-2, then RIT(3)=2. Similarly, if data is to be sent to node 11-4 through link 12-3, then CITt(4)=AIT(3,4) and RIT(4)=3. At this time, if AIT(2,3) or AIT(3,4) includes the circuit display information, load calculating section 22 excludes it from candidates for calculating CITt(3) or CITt(4).

Load information CITt(3) and load information CITt(4), which are calculated by load calculating section 22, are stored in routing information storage 24.

Transmission load information generating section 25 generates load information CITt2 corresponding to link 12-2 and load information corresponding to link 12-3 and sends them to transmitting section 26. Load information for link 12-2 is generated such that circuit display information is added to load information element CITt(3) for node 11-3, which is selected among load information elements CITt(3) and which satisfies routing information RIT(3)=2.

When load information CITt2 is generated by transmission load information generating section 25, transmission section 26 sends it onto link 12-2.

The above operation has been described in association with node 11-2. However, the same operation can be performed in other nodes. If link 12-2 is disconnected from the network, load information element CITt1(3) concerning node 11-3 and included in load information CITt1 sent from node 11-1 to node 11-2 has circuit display information (in this case, node 11-1 has received from node 11-2 or 11-5 a load information element including circuit display information for representing the disconnection of link 12-2 in the previous data transmission cycle. Therefore, node 11-2 can send data to node 11-4 through link 12-3 in order to send it to node 11-3. Therefore, node 11-4 sends data to node 11-3 through link 12-4.

What is claimed is:

1. A routing method in a computer communication network system comprising a plurality of network nodes each having a store and forward function and links for connecting adjacent ones of said nodes, comprising the steps of:

(a) receiving load information (CITri) (i: the link number) sent from the adjacent nodes through the links;

(b) calculating load values (AIT(i,j)) (i: a link number; and j: a node number) required for sending data to other nodes within the network as the adjacent nodes through the links, the load values (AIT(i,j)) being calculated on the basis of link load values (LIT(i)) (i: the link number) representing loads of the links, a node load value (NLT) representing a load of an intra node, and the load information (CITri) (i: the link number) received by said receiving section;

(c) storing, according to the nodes, the load values (AITij) having minimum values;

(d) storing, according to nodes, link numbers corresponding to the load value having the minimum value calculated in step (b);

(e) adding data-sent-back-inhibition information to the load values corresponding to the respective link numbers stored in step (d); and (f) sending, through the links to the adjacent nodes, minimum load values according to the nodes stored in the step (c) as a transmission load information.

2. The method according to claim 1, wherein the data-sent-back-inhibition information is represented by setting a most significant bit of the load value AIT(i,j) to be "1".

3. The method according to claim 1, wherein the data-sent-back-inhibition information is represented by calculating a two's complement of the load value AIT(i,j).

4. The method according to claim 1, wherein the step (b) includes a step of excluding the received load information CITri with the data-sent-back-inhibition information from calculating the load value AIT(i,j).

5. The method according to claim 4, wherein the load value is calculated by the following equation:

the load value AIT(i,j) (i: the link number, and j: the node number) = the received load information (CITri) + Link load value (LLT(i)) (i: the link number) + Node load value (NLT).

* * * * *